United States Patent [19]

Asano

[11] Patent Number: 5,394,311
[45] Date of Patent: Feb. 28, 1995

[54] AUTOMOTIVE TRUNK LID WITH STOP LAMP

[75] Inventor: Keiichi Asano, Hadano, Japan

[73] Assignee: Nissan Motor Co., Ltd., Yokohama, Japan

[21] Appl. No.: 206,947

[22] Filed: Mar. 7, 1994

[30] Foreign Application Priority Data

Mar. 18, 1993 [JP] Japan .................................. 5-057587

[51] Int. Cl.$^6$ .............................................. B60Q 1/00
[52] U.S. Cl. ..................................................... 362/80
[58] Field of Search ..................................... 362/78, 80

[56] References Cited

FOREIGN PATENT DOCUMENTS 62-174949 11/1987 Japan .
63-79237  5/1988 Japan .
2-21059   2/1990 Japan .
2-127558 10/1990 Japan .

*Primary Examiner*—Carroll B. Dority
*Attorney, Agent, or Firm*—Foley & Lardner

[57] ABSTRACT

A lamp-mounted trunk lid comprises an inner panel, a larger outer panel incorporated with the inner panel to constitute an upper portion of the trunk lid, and a smaller outer panel incorporated with the inner panel to constitute a lower portion of the trunk lid. The larger outer panel has a slot formed therethrough. The smaller outer panel has an upper end portion secured to a lower end portion of the larger outer panel. A stop lamp assembly is exclusively held by the smaller outer panel and exposed to the open air through the slot of the larger outer panel.

7 Claims, 2 Drawing Sheets

AUTOMOTIVE TRUNK LID WITH STOP LAMP

BACKGROUND OF THE INVENTION

1. Field of the Invention

The present invention relates in general to high-mount stop lamp arrangements of a wheeled motor vehicle, and more particularly, to automotive trunk lids of a type which is equipped with a lamp, such as a high-mount stop lamp or the like.

2. Description of the Prior Art

For safety's sake, some current motor vehicles are equipped with a so-called "high-mount stop lamp" in addition to regular stop lamps. The high-mount stop lamp is the stop lamp mounted on a higher position than the regular stop lamps.

Among various high-mount stop lamp arrangements, there is a type in which the stop lamp is mounted on a trunk lid of the motor vehicle. Some of the arrangements of this type are shown in Japanese Utility Model First Provisional Publications Nos. 62-174949, 63-79237, 2-21059 and 2-127558.

However, in the arrangements disclosed by these references, a troublesome and time consuming assembly work is needed for mounting the stop lamp to the trunk lid due to their inherent constructions. In fact, the lamp mounting procedure has to be made by stretching operator's hand or hands awkwardly under, up and around a back side of the trunk lid while paying attention to positioning of the stop lamp with respect to the trunk lid.

SUMMARY OF THE INVENTION

It is therefore an object of the present invention to provide a stop lamp-mounted trunk lid, which is free of the above-mentioned drawback.

It is another object of the present invention to provide a trunk lid which is constructed to facilitate the assembly work with which a stop lamp is mounted to a right position of the trunk lid.

According to the present invention, there is provided a lamp-mounted trunk lid for a motor vehicle, which comprises an inner panel; a larger outer panel incorporated with the inner panel to constitute an upper portion of the trunk lid, the larger outer panel having a slot formed therethrough and having a lower end portion; a smaller outer panel incorporated with the inner panel to constitute a lower portion of the trunk lid, the smaller outer panel having an upper end portion secured to the lower end portion of the larger outer panel; and a stop lamp assembly supported exclusively by the smaller outer panel and exposed to the open air through the slot of the larger outer panel.

DETAILED DESCRIPTION OF THE INVENTION

Figure 1:
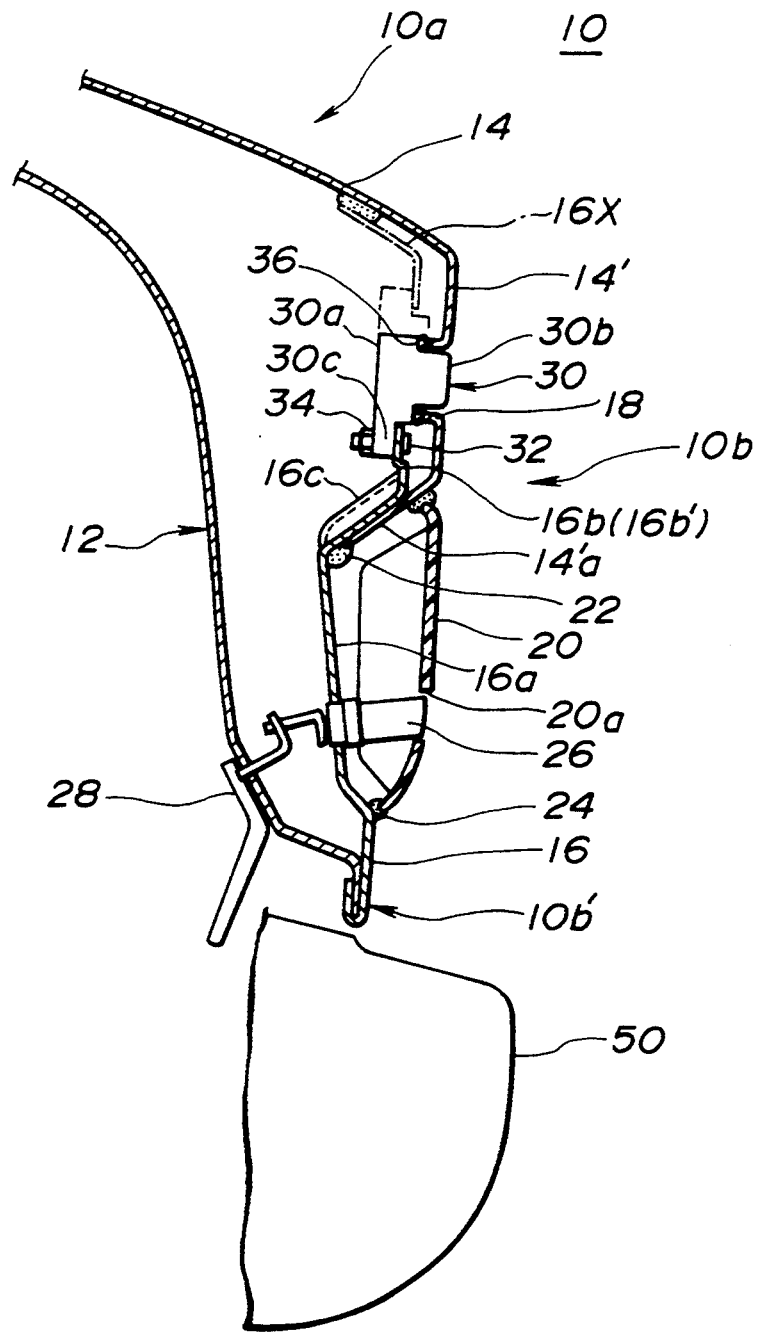
FIG. 1 is a sectional view of a rear portion of a trunk lid to which a stop lamp is mounted in a manner to embody the present invention.

Referring to the drawings, particularly FIG. 1, there is shown a rear bent part of a trunk lid 10 to which a stop lamp assembly 30 is mounted in a manner to embody the present invention. That is, the stop lamp assembly 30 serves as a high-mount stop lamp mounted on a rear portion of an associated motor vehicle.

As will be understood from FIG. 1, the trunk lid 10 comprises generally an upper flat portion 10a (partially shown) and a rear bent portion 10b.

Figure 2:
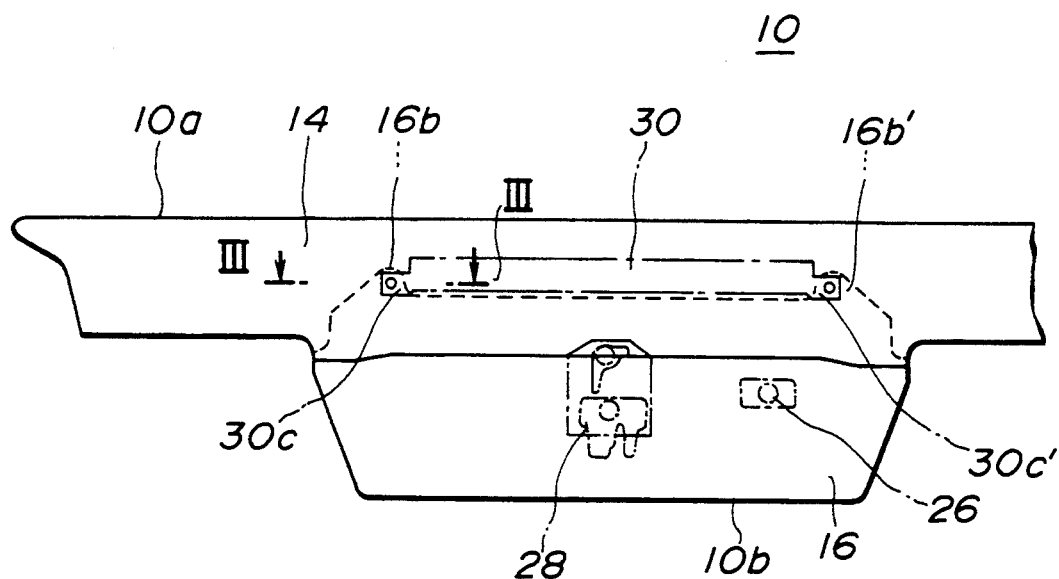
FIG. 2 is a front view of the rear portion of the trunk lid.

As is seen from FIG. 2, the rear bent portion 10b has a tongue-like structure which extends downward from the upper flat portion 10a.

Referring back to FIG. 1, when the trunk lid 10 is in a closed position as shown, a leading end 10b' of the rear bent portion 10b is positioned just above a rear bumper 50 which is secured to a rear end of the associated motor vehicle.

More specifically, the trunk lid 10 comprises an inner panel 12, a larger outer panel 14 and a smaller outer panel 16 which are united to constitute a swelled lid structure 10, as shown. That is, an upper major portion of the inner panel 12 and the larger outer panel 14 constitute the upper flat portion 10a of the trunk lid 10, while, a lower minor portion of the inner panel 12, a rear bent portion 14' of the larger outer panel 14 and the smaller outer panel 16 constitute the rear bent portion 10b of the lid 10.

The leading end 10b' of the rear bent portion 10b is constructed by folding back a terminal portion of the smaller outer panel 16 over a terminal end of the inner panel 12, as shown.

As is seen from FIG. 1, for the purposes which will become apparent as the description proceeds, the rear bent portion 14' of the larger outer panel 14 is formed with a laterally extending slot 18 and the smaller outer panel 16 is formed with a laterally extending depressed portion 16a. An inwardly projected edge of the laterally extending slot 18 is equipped therearound with an endless sealing thread 36 which is constructed of foamed rubber or the like.

As is understood from FIGS. 1 and 2, the smaller outer panel 16 is formed at both sides of the depressed portion 16a with raised bracket portions 16b and 16b' which are positioned near longitudinal ends of the slot 18 of the larger outer panel 14.

As is shown in FIG. 1, the raised bracket portions 16b and 16b' are formed at their base portions with reinforcing ridges 16c. The rear bent portion 14' of the larger outer panel 14 has an inclined leading portion 14'a mated with the raised bracket portions 16b and 16b' of the smaller outer panel 16, as shown. These mated portions are secured to each other through spot welding or the like. A paint sealing 22 is applied to the mated portions to assure sealing therebetween.

An elongate finisher 20 is mounted on the smaller outer panel 16 in a manner to cover the depressed portion 16a. The peripheral edge of the finisher 20 is applied with a sealing material 24.

The elongate finisher 20 is formed with a small opening 20a to which a front end of a key cylinder 26 is exposed. The key cylinder 26 is tightly held by the depressed bottom portion of the smaller outer panel 16. The key cylinder 26 is linked to a known lid locking device 28 which is held on the inner panel 12.

It is now to be noted that the stop lamp assembly 30 is assembled to the smaller outer panel 16 before the latter is secured to the inner panel 12 and the larger outer panel 14.

Figure 3:
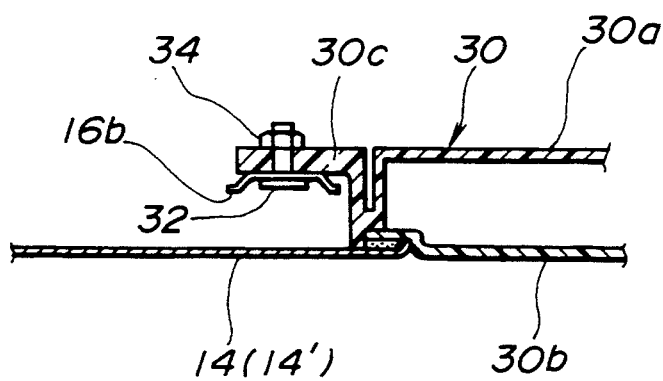
FIG. 3 is an enlarged sectional view taken along the line III—III of FIG. 2.

As is seen from FIG. 2, the stop lamp assembly 30 has an elongate structure, which, as is understood from FIG. 3, comprises an elongate case 30a, a lamp (not shown) installed in the case 30a, and an elongate transparent cover 30b covering an open side of the case 30a. The elongate case 30a has at its longitudinal ends two lug portions 30c and 30c.

As is seen from FIGS. 1 and 3, the lug portions 30c and 30c' of the stop lamp assembly 30 are secured, by means of bolts 32 and nuts 34, to the raised bracket portions 16b and 16b' of the smaller outer panel 16.

Upon assembly, that is, when the smaller outer panel 16, on which the stop lamp assembly 30 has been already mounted, is properly fixed to the inner panel 12 and the larger outer panel 14 in a manner as has been mentioned hereinabove, the stop lamp assembly 30 is received in the laterally extending slot 18 of the larger outer panel 14, as is understood from FIG. 1. Of course, the transparent cover 30b of the stop lamp assembly 30 faces outward. Due to provision of the endless sealing thread 36 around the inwardly projected edge of the slot 18, sealing is assured between the stop lamp assembly 30 and the slot 18.

In the following, advantages possessed by the lamp-mounted trunk lid 10 will be described.

(1) In the present invention, the stop lamp assembly 30 is mounted to the smaller outer panel 16, and then the smaller outer panel 16 which thus carries thereon the assembly 30 is brought into coupling with the trunk lid 10 (more specifically, a unit consisting of the inner panel 12 and the larger outer panel 14). Obviously, this mounting procedure is easily carried out. Particularly, the mounting of the stop lamp assembly 30 to the smaller outer panel 16 is precisely and quickly carried out since the assembly work can be made at an open space.

(2) Because the stop lamp assembly 30 and the smaller outer panel 16 constitute a united construction, positioning of the stop lamp assembly 30 relative to the slot 18 is readily and precisely achieved. That is, such positioning can be made by shifting or moving the smaller outer panel 16 to a right position with operator's hands before carrying out the coupling with the trunk lid 10.

If desired, the smaller outer panel 16 may have an upwardly extending part 16x which is secured to an inner surface of the larger outer panel 14. With this, the mechanical strength of the trunk lid 10 is increased.

What is claimed is:

1. A lamp-mounted trunk lid for a motor vehicle, comprising:
    an inner panel;
    a larger outer panel incorporated with said inner panel to constitute an upper portion of the trunk lid, said larger outer panel having a slot formed therethrough and having a lower end portion;
    a smaller outer panel incorporated with said inner panel to constitute a lower portion of the trunk lid, said smaller outer panel having an upper end portion secured to said lower end portion of said larger outer panel; and
    a stop lamp assembly supported exclusively by said smaller outer panel and exposed to the open air through said slot of the larger outer panel.

2. A lamp-mounted trunk lid as claimed in claim 1, in which said lower end portion of said larger outer panel overlies said upper end portion of said smaller outer panel, and in which said smaller outer panel has a lower end portion secured to a lower end portion of said inner panel.

3. A lamp-mounted trunk lid as claimed in claim 2, in which said smaller outer panel is formed at its upper portion with two raised bracket portions by which said stop lamp assembly is held.

4. A lamp-mounted trunk lid as claimed in claim 3, in which said stop lamp assembly is formed with two lug portions which are secured to said raised bracket portions through bolts and nuts.

5. A lamp-mounted trunk lid as claimed in claim 4, in which said raised bracket portions of said smaller outer panel are reinforced by ridges formed thereon.

6. A lamp-mounted trunk lid as claimed in claim 5, in which a major portion of said stop lamp assembly is received in said slot and in which a sealing member is interposed between said major portion and an inner wall of said slot.

7. A lamp-mounted trunk lid as claimed in claim 6, in which said smaller outer panel is formed with a laterally extending depressed portion and in which an elongate finisher is mounted on said smaller outer panel in a manner to cover said depressed portion.

* * * * *